(No Model.)  3 Sheets—Sheet 1.

S. B. SHERER.
WATER CART.

No. 344,684. Patented June 29, 1886.

Witnesses:
Jas. E. Hutchinson.
Chas. J. Williamson.

Inventor.
Saml. B. Sherer, by
Prindle & Russell, his Attys.

(No Model.) 3 Sheets—Sheet 1.
S. B. SHERER.
WATER CART.
No. 344,684. Patented June 29, 1886.
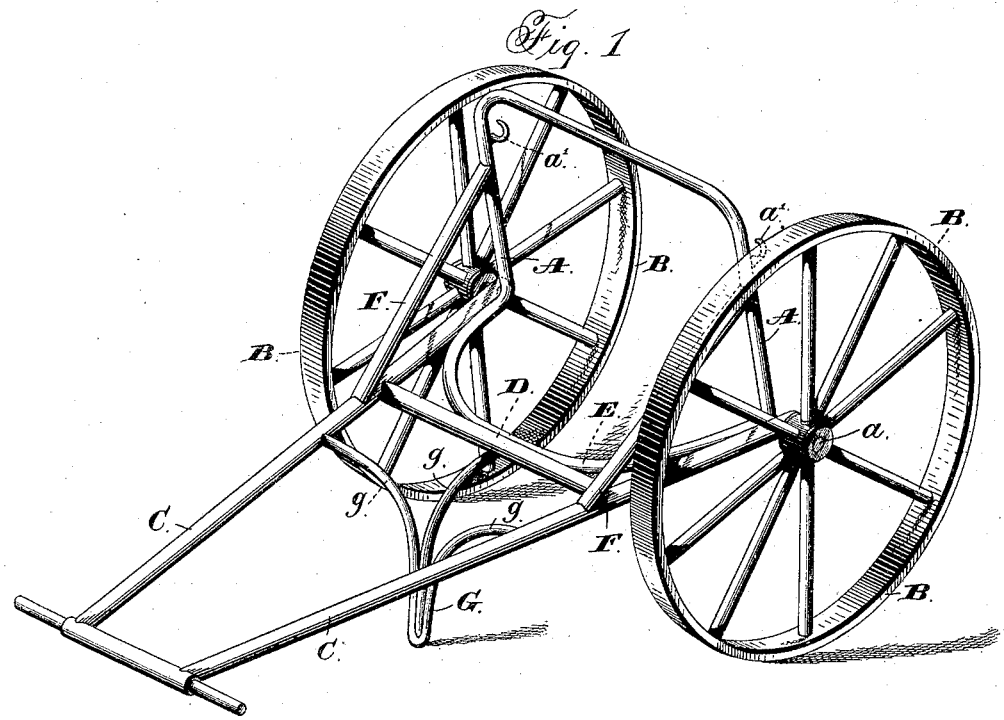
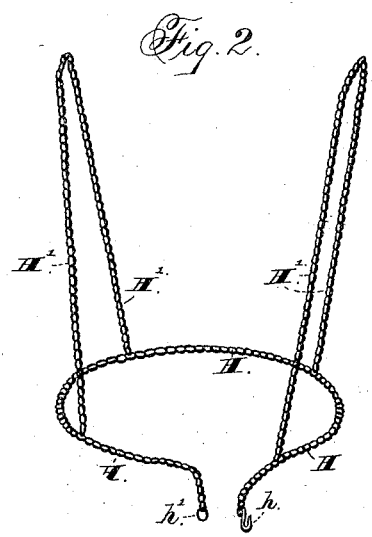
Witnesses:
Jas. E. Hutchinson.
Chas. J. Williamson.
Inventor.
Daniel B. Sherer, by
Prindle & Russell, his Att'ys (No Model.) 3 Sheets—Sheet 2.

S. B. SHERER.
WATER CART.

No. 344,684. Patented June 29, 1886.

Witnesses:
Jas. E. Hutchinson.
Chas. J. Williamson.

Inventor.
Samuel B. Sherer, by
Prindle & Russell, his Attys.

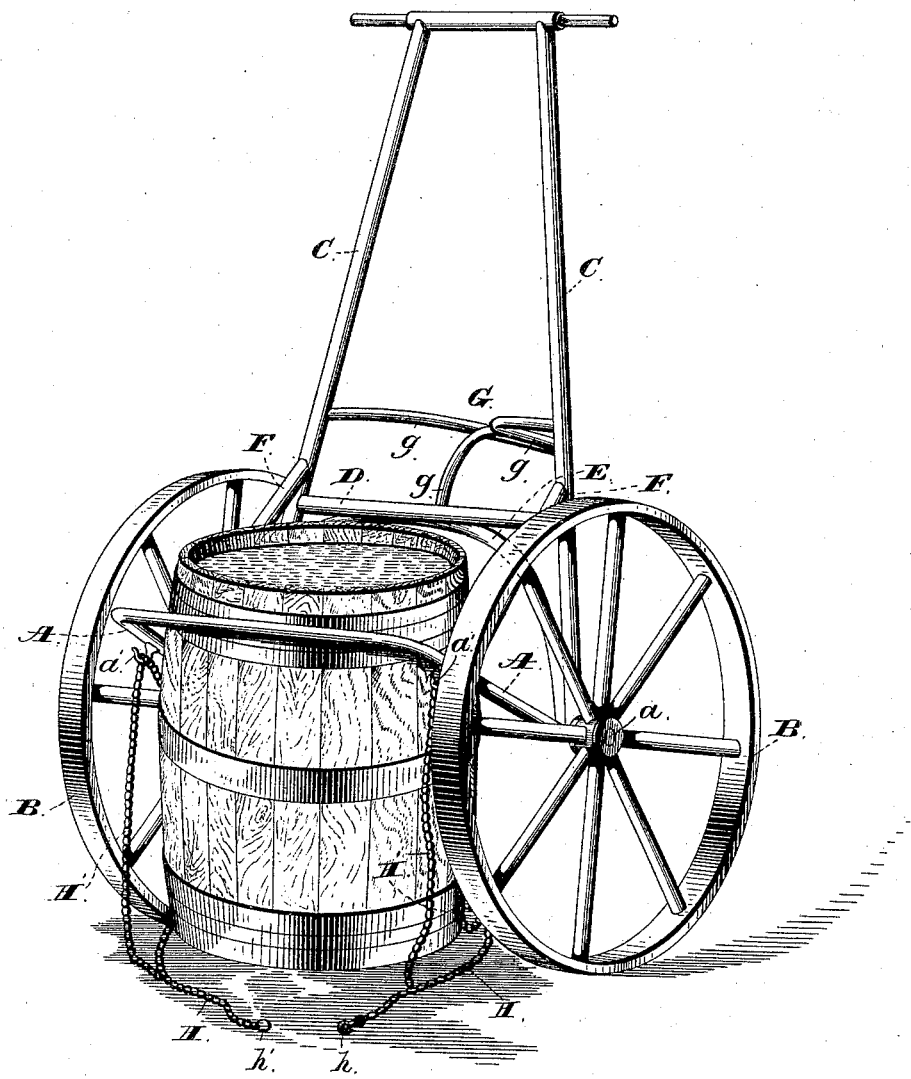

UNITED STATES PATENT OFFICE.

SAMUEL B. SHERER, OF AURORA, ILLINOIS.

WATER-CART.

SPECIFICATION forming part of Letters Patent No. 344,684, dated June 29, 1886.

Application filed March 4, 1886. Serial No. 194,059. (No model.)

*To all whom it may concern:*

Be it known that I, SAMUEL B. SHERER, of Aurora, in the county of Kane, and in the State of Illinois, have invented certain new and useful Improvements in Water-Carts; and I do hereby declare that the following is a full, clear, and exact description thereof, reference being had to the accompanying drawings, in which—

Figure 1:
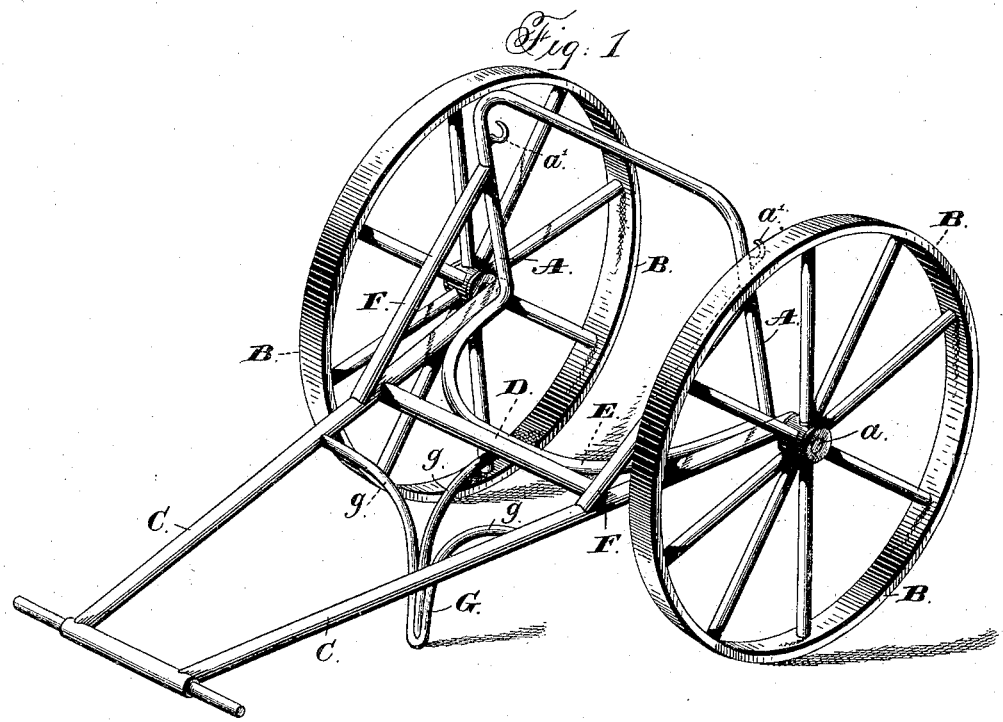
Figure 2:
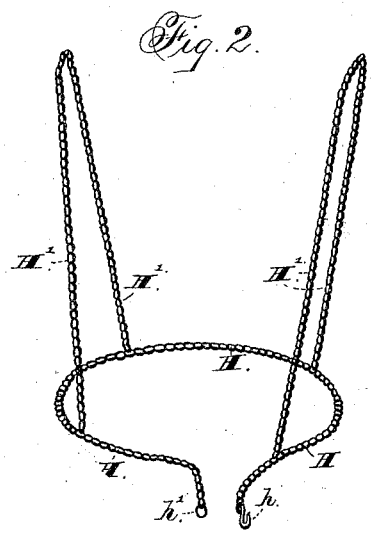
Figure 3:
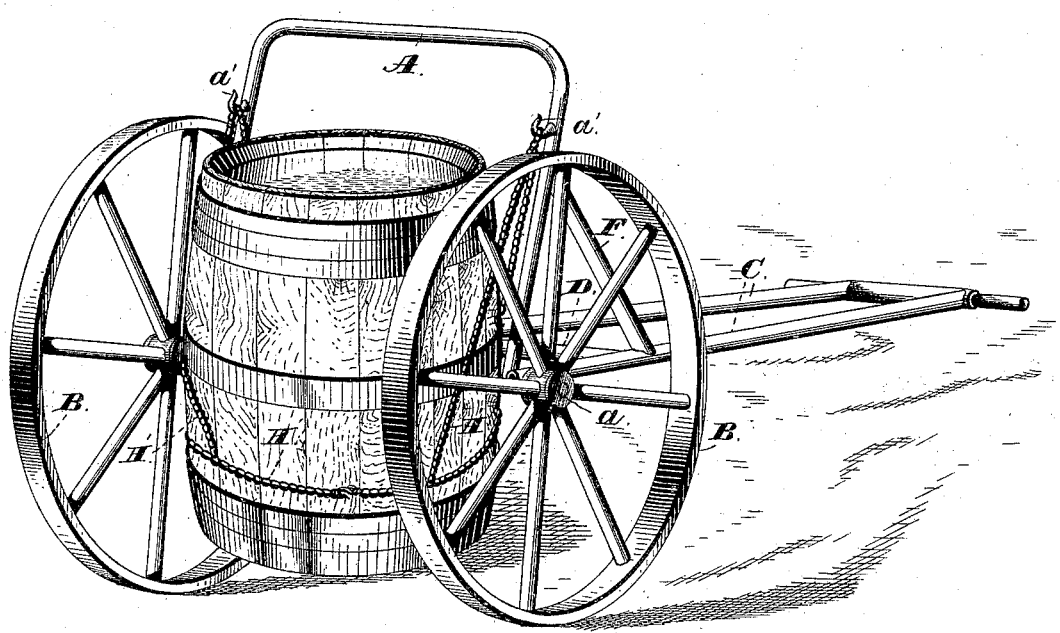
Figure 4:
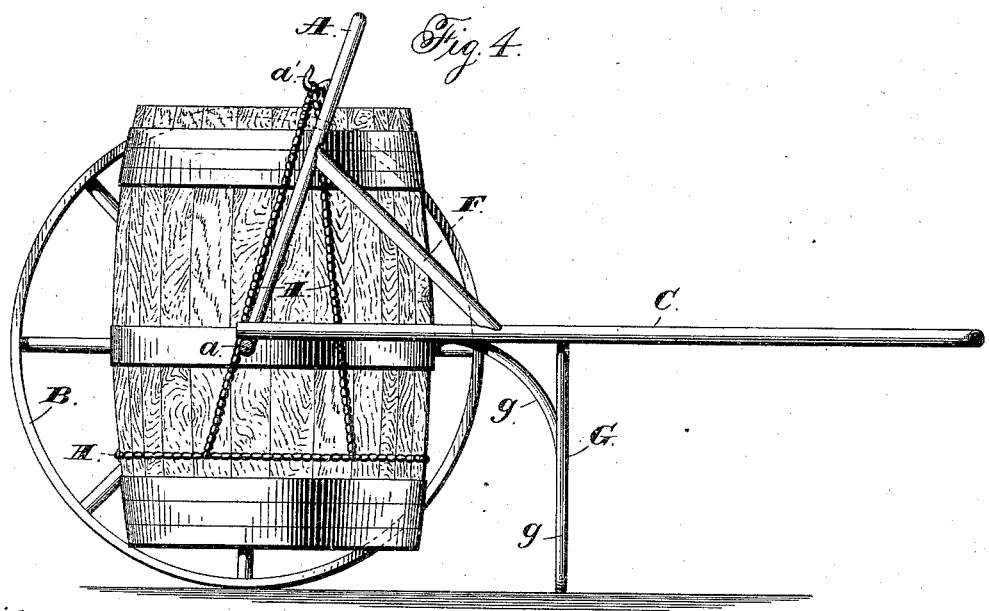

Figure 1 is a perspective view of my improved cart. Fig. 2 is a like view of the suspensory-chains used with the same. Fig. 3 is a perspective view of said cart when carrying a barrel. Fig. 4 is a side elevation of the same; and Fig. 5 is a like view of said cart when in position to engage with or be disengaged from a barrel.

Letters of like name and kind refer to like parts in each of the figures.

My invention is intended to furnish a simple, efficient, and inexpensive means whereby barrels may be moved from place to place; and it consists, principally, as a means for moving barrels in a two-wheeled cart, which is adapted to receive a barrel between its wheels, in combination with a sling that is adapted to engage with a barrel, and to suspend the same from the axle or frame of said cart between its wheels, substantially as and for the purpose hereinafter specified.

It consists, further, as a means for moving barrels in a two-wheeled cart which is provided with an arched axle or frame, that enables it to be placed over a barrel, in combination with chains which are adapted to engage with a barrel and suspend the same between the wheels, substantially as and for the purpose hereinafter shown.

It consists, finally, as a means for moving barrels in a two-wheeled tiltable cart, which is adapted to be placed over a barrel, in combination with a sling that is adapted to engage with a barrel, and is attached to the frame or axle of said cart, so that when the latter is tilted the barrel will rest upon the ground, and when said cart occupies its normal position said barrel will be suspended between the wheels of the same, substantially as and for the purpose hereinafter set forth.

In the carrying of my invention into practice I employ an axle, A, which at each end is provided with axle-arms $a$, that receive and upon which are journaled two ground-wheels, B, of usual form. Between said wheels said axle is extended upward and across in the form of a flattened arch, which arch has sufficient height and width to enable it to be placed over a barrel of the largest dimensions that is to be moved. From the point where the axle A at each side is turned upward a shaft, C, extends rearward, and preferably slightly inward, and at its rear end is connected with the opposite shaft, C, by means of a cross-bar, D, which latter also serves as a handle for the cart. A curved brace, E, is placed between the front portion of said shafts, with its ends secured to the inner sides at the front ends of the same, while at each side a brace, F, extends at an angle of about forty-five degrees between, and has its ends secured to said shaft and the upper portion of the vertical side of the axle-arch. A chain-hook, $a'$, at or near the point of intersection of each brace F with the axle-arch, and a foot, G, composed of a number of rods, $g$, which are secured to the brace E and to the shafts C, and from thence extend downward and inward, together complete the cart.

With the cart described is used a chain-sling, which is in part composed of a horizontal loop, H, that has its ends connected by a hook, $h$, and ring $h'$, or by other suitable means, and is capable of being shortened or lengthened within certain predetermined limits.

To each side of the loop H are attached the ends of a chain, H', which from thence extends upward, and at its center is adapted to engage with one of the hooks $a'$. Said chain H may, if desired, be made longitudinally extensible or contractible.

In use the cart is moved to a barrel, which is placed on end. The chain-loop is unhooked and said cart then placed in the position shown in Fig. 5, its rear end being raised until the hooks $a'$ are considerably below their normal position, after which said chain-loop is drawn around and secured upon said barrel at a point below its longitudinal center, and the rear end of said cart then turned downward to its normal position, by which means said barrel will be raised from off the ground and suspended between the wheels, as seen in Fig. 3, when it may be as easily moved with said cart as would any equal weight suitably placed upon or suspended from its frame.

Having thus described my invention, what I claim is—

1. As a means for carrying barrels, the frame having the upwardly-arched axle and the two wheels journaled on such axle, in combination with a sling hung from the arched portion of the axle, adapted to receive and suspend a barrel, substantially as and for the purpose set forth.

2. In combination with the cart-frame having the arched axle, and the handles attached to the axle so as to stand at less than a right angle to the arched portion thereof, the wheels journaled on the axle on opposite sides of its arch, and the sling adapted to hold and suspend a barrel hung from the arch in the axle, substantially as and for the purpose described.

3. In combination with the arched axle and the supporting-wheels journaled thereon, the handle rigidly connected with the axle, and the sling consisting of a portion to surround and hold the barrel and two portions at each side hung from the arch of the axle and connected with the barrel-holding portion at different points, substantially as and for the purpose specified.

In testimony that I claim the foregoing I have hereunto set my hand this 9th day of February, A. D. 1886.

SAMUEL B. SHERER.

Witnesses:
J. M. KENNEDY,
R. M. GATES.